United States Patent [19]

Nash

[11] 4,169,992

[45] Oct. 2, 1979

[54] FEEDBACK SPEED CONTROL OF SPRING POWERED GENERATOR

[75] Inventor: Donald Nash, Santa Ana, Calif.

[73] Assignee: Bible Translations on Tape, Inc., Cedar Hill, Tex.

[21] Appl. No.: 854,426

[22] Filed: Nov. 23, 1977

[51] Int. Cl.² .............................................. H02P 9/04
[52] U.S. Cl. ........................................ 322/29; 322/46; 290/1 E
[58] Field of Search ................................... 322/29–32, 322/46; 290/1 E; 318/314, 318, 341

[56] References Cited

U.S. PATENT DOCUMENTS

| | | | |
|---|---|---|---|
| 3,121,838 | 2/1964 | Mozic | 322/32 |
| 3,409,814 | 11/1968 | Azuma et al. | 318/341 |
| 3,675,113 | 7/1972 | Bader et al. | 290/1 E |
| 3,937,001 | 2/1976 | Berney | 322/29 X |

*Primary Examiner*—Robert J. Hickey
*Attorney, Agent, or Firm*—Edward D. O'Brian

[57] ABSTRACT

In the operation of a generator by a source of mechanical power such as a spring motor delivering a variable amount of power to the generator a feedback circuit may be used to monitor the output of the generator. The feedback circuit is employed to provide an input back into the generator which serves to control the speed of rotation of the generator so that such speed is substantially constant. In the preferred embodiment disclosed the generator is an alternator and the frequency of the output of the alternator is monitored in the course of providing input back to the alternator.

5 Claims, 1 Drawing Figure

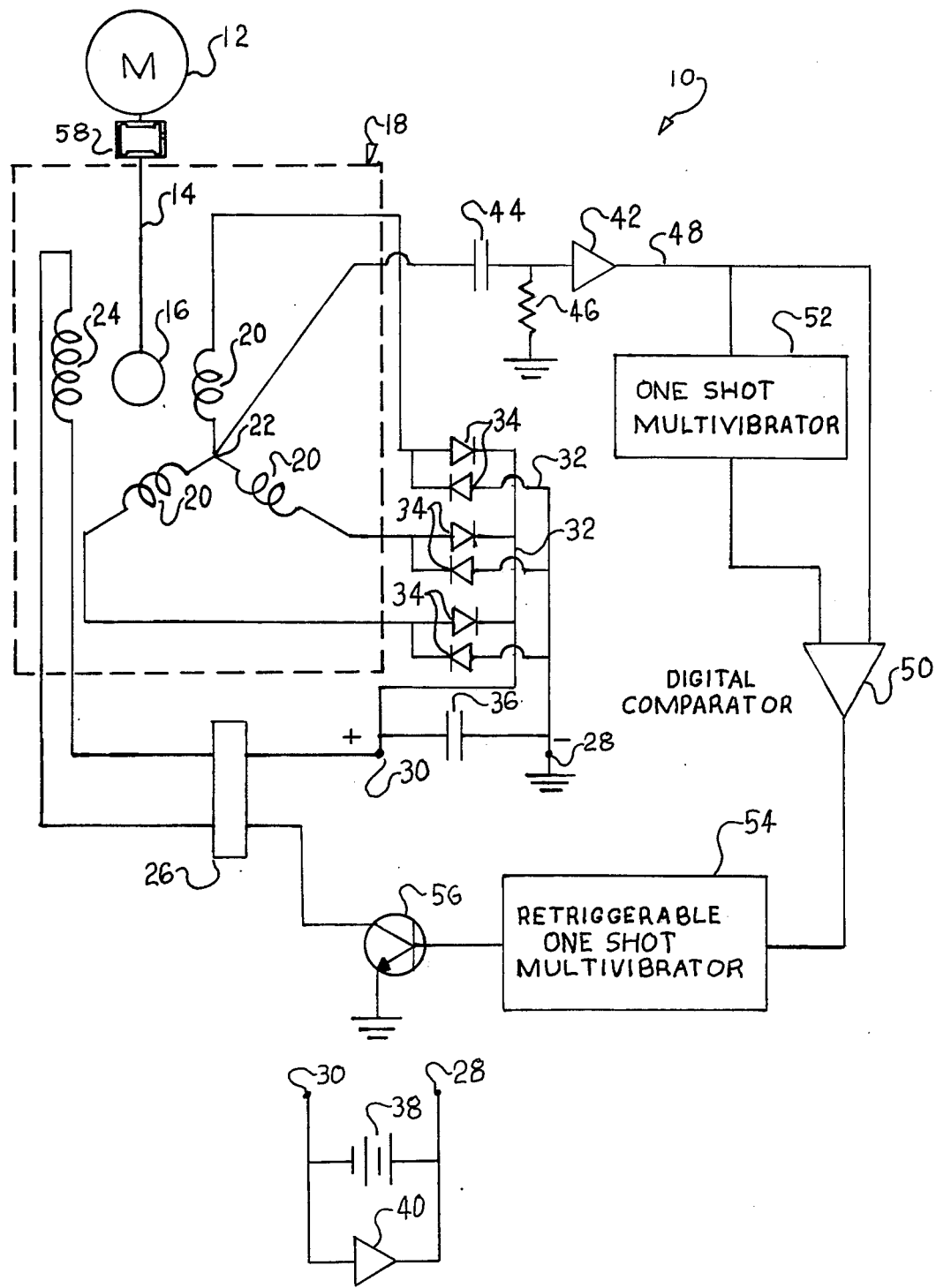

FEEDBACK SPEED CONTROL OF SPRING POWERED GENERATOR

CROSS REFERENCE TO RELATED APPLICATIONS

The subject matter of this specification is especially adapted to be utilized with generators as are set forth in the co-pending Donald Nash application Ser. No. 854,419 filed 11-23-77, entitled "GENERATOR CAPABLE OF BEING POWERED BY A SPRING MOTOR". In the interest of brevity the entire disclosure of this noted co-pending application is incorporated herein by reference.

BACKGROUND OF THE INVENTION

The invention set forth in this specification pertains to the control of the speed at which a rotor in a generator such as an alternator is operated when the generator is driven by a source of mechanical power such as a spring motor which delivers or is capable of delivering a variable amount of mechanical power to the generator.

The invention is intended to be utilized in connection with small, spring motor powered, portable cassette tape players. To be acceptable from a cost standpoint such devices must be comparatively inexpensive, comparatively simple in construction, and comparatively reliable in operation. Further, to achieve these characteristics such devices must be constructed in such a manner as to minimize the number of parts employed in them. In order for such a tape player to operate it is necessary to utilize within it a generator such as an alternator to provide electrical power to operate an amplifier. The rotation of the rotor of the generator in this type of device should be held relatively constant in order to minimize the problems in connection with the construction of the amplifier. Also it is necessary in such a device to provide a mechanical output in the form of rotation at a constant speed in order to satisfactorily drive the tape mechanism employed.

It is well known that a spring motor is normally constructed so that its mechanical output will vary in accordance with the mechanical energy stored with a spring and that the amount of such energy will decrease as the spring motor is operated. As a consequence of this a spring motor will normally deliver a variable mechanical output to a generator in a tape player type device as indicated in the preceding discussion unless means are employed to regulate or govern the output of the spring motor. Further, such spring motors will not provide uniform mechanical outputs for driving the tape mechanisms unless such regulation or governing means are provided. A number of different devices and structures have been proposed for this purpose.

Most commonly, mechanical governors have been proposed for use with spring motors since such mechanical governors are available as a result of extensive work which has been done in connection with the utilization of spring motors in all sorts of applications. It has also been proposed to regulate the speed at which a generator is operated by a spring motor through the utilization of a solenoid type latch device which operates in accordance with the voltage produced by a governor. It has also been proposed to govern generator speed in the combination of a spring motor and a generator by varying the load on the generator. In one application of this type of control a diode has been utilized which becomes conductive at a predetermined voltage so as to increase the load on the generator at such voltage.

It is not considered that any of such procedures are particularly desirable. Mechanical governors have the familiar problems inherent with moderately complex mechanical devices. The use of a latch type device as indicated in the preceding to a degree also has the problems associated with the use of any other essentially mechanical device. Various previously known electrical expedients involving changing the load on the generator are not considered to be effective in achieving the precise degree of control necessary so that the controlled speed of the generator can be utilized for the mechanical purpose of operating a tape playback mechanism at a uniform speed. In an application such as the intended application of the invention reasonably accurate speed control is necessary if the sound playback mechanism is to operate satisfactorily.

SUMMARY OF THE INVENTION

An objective of the present invention is to provide a new and improved method for controlling the speed at which a rotor within a generator is operated when the generator is driven by a source of mechanical power which delivers or is capable of delivering a variable amount of mechanical power to the generator. The invention is intended to provide a method for this purpose which is effective, reliable, and which can be inexpensively carried out. Although the method of the invention is primarily intended to be utilized and is considered to be specifically adapted for use in connection with a spring motor serving as such a source of power, the method of the invention is of such a character that it can be utilized with other sources of mechanical power.

Another objective of the invention is to provide new and improved apparatus for use in controlling the speed at which a rotor within a generator is rotated when the generator is driven by a source of mechanical power which delivers or is capable of delivering a varying amount of power to the generator. The invention is intended to provide an apparatus for this purpose which is particularly adapted for use in combination with a spring motor serving as such a source of mechanical power. The invention is intended to provide apparatuses as indicated which are comparatively simple to construct, which are comparatively reliable, and which are relatively inexpensive.

In accordance with this invention these objectives are achieved by providing in a combination of a generator, mechanical means for rotating a part of the generator so as to operate the generator, said mechanical means being capable of delivering a variable amount of mechanical power to said part of said generator during the operation of said generator and load means for receiving the current produced by the generator as it is operated, the improvement which comprises:

feedback circuit means for controlling the speed of rotation of said part of said generator so that said speed of rotation remains substantially constant as there is variation in mechanical power delivered to the generator by said mechanical means, said feedback means being connected to said generator so as to receive an output from said generator and being capable of detecting a variation in said output, said feedback means being capable of providing an electrical input to said generator in accordance with the variation in the output from the generator.

BRIEF DESCRIPTION OF THE DRAWING

Because of the nature of this invention it is best more fully explained with reference to the accompanying drawing in which:

The FIGURE is a diagrammatic view indicating the operative parts of an apparatus in accordance with this invention in a diagrammatic manner.

The invention itself involves certain essentially intangible concepts or principles as are set forth and defined in the appended claims forming a part of this specification. These concepts or principles are embodied and/or utilized within an apparatus as indicated in the drawing. They may be also utilized within a variety of somewhat differently constructed apparatuses through the use or exercise of routine skill in the field of generator design and construction.

DETAILED DESCRIPTION

In the drawing there is shown an apparatus 10 in accordance with this invention which includes a conventional helical spring motor 12. This motor 12 is indicated in diagrammatic form since motors of this type are well-known and are commonly utilized for many purposes such as, for example, in various types of toys. This motor 12 has an output shaft 14 which is coupled to the rotor 16 of a diagrammatically indicated generator 18.

The generator 18 which it is preferred to utilize in connection with this invention is preferably an alternator constructed as set forth in the aforementioned U.S. patent application entitled "GENERATOR CAPABLE OF BEING POWERED BY A SPRING MOTOR", Ser. No. 854,419 filed, 11-23-79.

In the particular generator 18 diagrammatically illustrated there are a series of stator coils 20 connected in a "Y" arrangement having a center tap 22 which is connected to various circuit components as hereinafter described. The rotor 16 diagrammatically illustrated is a permanent magnet rotor which is adapted to be rotated relative to the stator coils 20 in order to result in the generation of an alternating current.

The generator 18 also includes a control coil winding 24 located in such a position that as current flows through the winding 24 a magnetic field is set up which interacts with the magnetic field or fields from the permanent magnets (not shown) on the rotor 16 in such a manner as to vary the production of electric current in the stator coils 20 as the rotor 16 is mechanically rotated by the motor 12. Although the control winding 24 may be located adjacent to the rotor 16 it is considered preferable to locate it on the rotor 16 and to connect it to various circuit components as hereinafter indicated by slip rings 26 as are diagrammatically illustrated in the drawing.

From an examination of the drawing it will be apparent that the stator coils 20 are connected across a grounded negative terminal 28 and a positive terminal 30 through wires 32 containing a series of diodes 34 so as to achieve a rectified output at the terminals 28 and 30. If desired a filter capacitor 36 may be connected between the terminals 28 and 30 for the obvious purpose. As indicated in the drawing a "load" (not separately numbered) consisting of a battery 38 and an amplifier 40 may be connected across the terminals 28 and 30. Such a "load" is as used in a cassette tape player constructed so as to utilize the present invention. In other applications other loads will, of course, be substituted.

The center tap 22 is connected to a conventional known operational amplifier 42. It is considered preferable to utilize a conventional filter network (not separately numbered) consisting of a capacitor 44 and a grounded resistor 46 between the operational amplifier 42 and the generator 18 for the obvious purpose. This operational amplifier 42 is employed so as to provide an output at a line 48 which consists of a series of substantially square wave pulses corresponding to alternating current surges or ripples obtained from the generator 18. The widths of these square wave pulses will vary in accordance with any variation in the operation of the generator 18.

The line 48 is directly connected to a known, conventional digital comparator 50 and is also connected to the comparator 50 through a conventional, known one-shot multivibrator 52. This multivibrator 52 is used to provide square wave pulses of a reference or uniform pulse width to the comparator 50 where such pulses can be compared as to pulse width with the pulses directly received from the operational amplifier 42. The particular comparator 50 employed with the illustrated circuit consists of or gates and only detects if the pulses directly received from the operational amplifier 42 are shorter than the reference pulses from the multivibrator 52.

This comparator 50 provides a pulse output to a retriggerable one-shot multivibrator 54 of a known, conventional construction. This pulse output from the comparator 50 consists of a series of pulses having widths which are proportional to the differences in the pulse widths compared in the comparator 50. This pulse output from the comparator 50 is used to drive the retriggerable one-shot multivibrator 54 so that this multivibrator 54 provides pulses corresponding to the pulses received from the comparator 50 but of uniform duration or width to the base of a transistor 56.

This transistor 56 has an emitter connected to a negative ground and a collector connected to one of the slip rings 26. The other of the slip rings 26 is connected back to the positive terminal 30. With this structure it is considered obvious that the transistor 56 goes conductive in response to pulses from the multivibrator 54 so as to permit current to flow in the control winding 24 when there is a variation in the operation of the generator 18 such as would be caused by a "winding down" or discharge of energy from the spring motor 12.

As current flows through the control winding 24 it sets up a magnetic field as indicated in the preceding discussion which operates in conjunction with the magnetic fields from the rotor 16 in order to control the speed of the rotor 16 so that this speed is substantially constant. As a result of this speed being substantially constant mechanical power such as is required to drive a capstan of a tape player at a constant speed may be obtained by a direct mechanical connection to either the rotor 16 or the shaft 14. In the drawing a pulley 58 is diagrammatically shown on the shaft 14 for the purpose of providing a mechanical output at a controlled, constant speed.

From a consideration of the preceding it will be apparent that the various circuit components described constitute a feedback circuit (not separately numbered) for monitoring the electrical output of the generator 18 and for providing an input back into the generator to control the speed at which the rotor 16 of the generator 18 operates. Such control is independent of the operation of the motor 12 although of course the motor 12 continually operates so as to turn this rotor 16.

In effect the circuit indicated acts as an electrical governor so as to control the operation of the generator 18 even though the amount of mechanical power supplied to the rotor 16 of the generator 18 may vary. It is considered that such control can be advantageously utilized with a number of other power sources than spring motors. The particular circuit shown is intended to be utilized with common spring motors and is intended to accommodate the fact that such motors tend to "wind down" as they operate after being wound up.

It is possible to accomplish the objectives of this invention with modifications in the precise circuit shown which are considered to be well within the skill of the art. As an example of this a suitable feedback circuit utilizing the concepts of the present invention could replace the retriggerable one-shot multivibrator 52 with a conventional integrating circuit which would provide a DC current to the base of the transistor 56 which would be proportional to the widths of the pulses provided by the comparator 50. The transistor 56 would operate as described in the preceding with such modification so as to control current in the control winding 24.

The particular pulse type operation employed with the described components is considered to be satisfactory to give substantially consistent control so as to achieve relatively constant rotor operation with a minimum of difficulty Also, with the "pulsing" mode of operation employed the transistor 56 operates in a switching mode. This has the advantage of low power dissipation.

I claim:

1. In the combination of an alternator having a rotor and a stator, mechanical means for rotating the rotor of said alternator so as to operate said alternator so as to provide an AC ripple output, said mechanical means being capable of delivering a variable amount of mechanical power to said rotor of said alternator during the operation of said alternator and load means for receiving the current produced by said alternator as it is operated, the improvement which comprises:

said alternator includes control winding means for use in creating a magnetic field controlling the magnetic coupling between said rotor and said stator;

feedback circuit means for controlling the speed of rotation of said rotor of said alternator so that said speed of rotation remains substantially constant as there is variation in the mechanical power delivered to said alternator by said mechanical means, said feedback means being connected to said alternator so as to receive an output from said alternator and being capable of detecting a variation in said output, said feedback means being capable of providing an electrical input to said alternator in accordance with the variation in the output from said alternator;

said circuit means including means for receiving said output from said alternator and for converting said output from said alternator into a series of pulses corresponding to an AC ripple, means for providing pulses of uniform duration, each of which corresponds to one of said pulses corresponding to said AC ripple, means for comparing the duration of said pulses of uniform duration with said pulses corresponding to said AC ripple, and means for releasing current to said control winding in accordance with any variation between the duration of the pulses of a uniform duration and said pulses corresponding to said AC ripple, said means for releasing current serving to release a current to said control winding in a sufficient amount so that said control winding provides a magnetic field which holds the speed of rotation of said rotor substantially constant.

2. The combination claimed in claim 1 in which:

said alternator includes a control winding, said control winding being located adjacent to said rotor and said stator so as to be capable of being used to create a magnetic field controlling the magnetic coupling between said rotor and said stator.

3. The combination claimed in claim 2 wherein:

said rotor includes permanent magnet means for creating a magnetic field, said control winding means is located on said rotor adjacent to said permanent magnet means.

4. The combination as claimed in claim 1 in which:

said means for releasing current includes a transistor, and means for operating said transistor in accordance with said variation between the duration of said pulses.

5. A process of controlling the speed of rotation of a rotor of an alternator providing an AC output as said alternator is being operated by said rotor being rotated by a mechanical means capable of delivering a variable amount of mechanical power to said rotor which includes the steps of:

monitoring the output of said alternator so as to detect any variation therein, said monitoring including (a) converting said AC output into a series of pulses corresponding to an AC ripple, (b) creating a series of pulses of uniform duration, each of which corresponds to one of said pulses corresponding to said AC ripple, (c) comparing said pulses of uniform duration with said pulses corresponding to said AC ripple so as to obtain a signal indicating the difference between said pulses, providing an electrical input to said alternator in accordance with any variation of said output of said alternator, said input comprising an electric signal serving to create a magnetic field affecting the coupling between said rotor and said stator in said alternator, said step of providing an input including utilizing said signal corresponding to the difference between said pulses to provide a control signal controlling the release of a current through a control winding forming a part of said alternator producing a magnetic field as a result of said current release through said control winding, and using said magnetic field so as to control the magnetic coupling between said motor and the remainder of said alternator so as to control the speed of rotation of said rotor.

* * * * *

UNITED STATES PATENT AND TRADEMARK OFFICE
CERTIFICATE OF CORRECTION

PATENT NO. : 4,169,992
DATED : OCTOBER 2, 1979
INVENTOR(S) : DONALD NASH

It is certified that error appears in the above-identified patent and that said Letters Patent are hereby corrected as shown below:

Column 5, line 32, after "difficulty" insert a period.

Column 6, line 64, cancel "motor" and insert --rotor--.

Signed and Sealed this

Twenty-ninth Day of April 1980

[SEAL]

Attest:

SIDNEY A. DIAMOND

Attesting Officer

Commissioner of Patents and Trademarks